United States Patent
Shirai et al.

[11] Patent Number: 6,040,665
[45] Date of Patent: Mar. 21, 2000

[54] ELECTRIC BRAKE DEVICE

[75] Inventors: Kenji Shirai, Mishima; Seiya Yokoyama, Toyohashi; Tsutomu Oota, Hamakita, all of Japan

[73] Assignee: Toyota Jidosha Kabushiki Kaisha, Aichi-ken, Japan

[21] Appl. No.: 09/364,887

[22] Filed: Aug. 2, 1999

[30] Foreign Application Priority Data

Aug. 31, 1998 [JP] Japan ................... 10-246255

[51] Int. Cl.⁷ .................. B60T 8/00; B60T 13/74
[52] U.S. Cl. ................ 318/14; 318/563; 318/646; 188/158; 188/162
[58] Field of Search ................ 318/14, 563, 646, 318/652, 432, 434, 461; 388/930; 310/311; 188/72.1, 72.3, 158, 162, 106 P; 303/20, 189

[56] References Cited

U.S. PATENT DOCUMENTS

| | | | |
|---|---|---|---|
| 4,995,483 | 2/1991 | Moseley et al. | 188/162 |
| 5,090,518 | 2/1992 | Schenk et al. | 188/72.1 |
| 5,125,483 | 6/1992 | Kitagaawa et al. | 188/158 |
| 5,722,744 | 3/1998 | Kupfer et al. | 303/189 |
| 5,931,268 | 8/1999 | Kingston et al. | 188/162 |

FOREIGN PATENT DOCUMENTS 3-500918  2/1991  Japan.
7-291120 11/1995  Japan.

Primary Examiner—Bentsu Ro
Attorney, Agent, or Firm—Kenyon & Kenyon

[57] ABSTRACT

An electric brake device includes a disc rotor which is rotatable together with a wheel of an automotive vehicle. An output rod is provided to press a friction pad onto the disc rotor so as to exert a braking force on the wheel. A brake motor is provided to generate a rotating force in response to an electric signal. A gear mechanism is provided to axially move the output rod relative to the disc rotor in accordance with the rotating force, such that the output rod is moved toward the disc rotor when the brake motor rotates in a forward direction, and the output rod is separated from the disc rotor when the brake motor rotates in a reverse direction. A load detection unit detects a load acting on an end of the output rod opposite to a position where the output rod presses the friction pad onto the disc rotor. A motor deceleration unit decreases the rate of rotation of the brake motor when the load detected by the load detection unit is above a reference level.

8 Claims, 7 Drawing Sheets

ELECTRIC BRAKE DEVICE

BACKGROUND OF THE INVENTION (1) Field of the Invention

The present invention generally relates to an electric brake device, and more particularly to an electric brake device in which a brake motor is electrically driven in a forward direction so as to exert a braking force on a vehicular wheel, and the brake motor is electrically driven in a reverse direction so as to cancel the braking force on the vehicular wheel.

(2) Description of the Related Art

As disclosed in Japanese Laid-Open Patent Application No.7-291120, an electric brake device is known. The brake device of the above publication includes a brake motor, a disc rotor, and a pair of friction pads. The disc rotor is attached to a vehicular wheel, and the disc rotor is rotatable together with the vehicular wheel. The disc rotor is interposed between the friction pads. The disc rotor is pinched by the friction pads by rotation of the brake motor so that a braking force is exerted on the vehicular wheel via the disc rotor.

In the electric brake device of the above publication, the brake motor is connected through a mechanical clutch to a brake caliper. In the brake caliper, an internal cylinder is formed and a piston which is slidable on the cylinder is provided in the brake caliper. The piston is movably supported on a reversible screw shaft. The piston is secured to one of the friction pads. A movement of the piston in the axial direction of the cylinder, which causes the braking force of the friction pads to be exerted on the disc rotor, is derived from a rotation of the reversible screw shaft.

An output shaft of the brake motor is connected to the reversible screw shaft via the mechanical clutch. When a brake pedal is depressed by a vehicle operator, the brake motor rotates in the forward direction by a power supplied to the brake motor in response to the brake pedal depression. As the reversible screw shaft is rotated in the forward direction by the brake motor, the piston is moved to push the friction pads on the disc rotor. By the friction between the friction pads and the disc rotor, the braking force is exerted on the vehicular wheel. When the brake pedal is released from the brake pedal, the brake motor rotates in the reverse direction so as to separate the friction pads from the disc rotor. The mechanical clutch acts to cut off the transmission of the torque from the brake motor to the reversible screw shaft. By the separation of the friction pads from the disc rotor, the braking force on the vehicular wheel is canceled.

In the electric brake device of the above publication, by electrically driving the brake motor in a controlled manner, the electric brake device can generate an appropriate braking force to be exerted on the vehicular wheel.

However, there may be a case in which the output shaft of the brake motor is subjected to excessive reverse rotation when the brake motor rotates in the reverse direction. In such a condition, the excessive reverse rotation of the brake motor is detrimental to the related parts which are connected to the output shaft of the brake motor. It is necessary to reliably prevent the excessive reverse rotation of the brake motor in order to avoid the failure of the related parts connected to the output shaft of the brake motor.

In the electric brake device of the above publication, the mechanical clutch is provided to cut off the transmission of the torque from the brake motor to the reversible screw shaft. When the reversible screw shaft is separated from the brake motor by the mechanical clutch, the reversible screw shaft is not rotated regardless of whether the brake motor excessively rotates in the reverse direction. The mechanical clutch enables the electric brake device of the above publication to prevent the excessive reverse rotation of the brake motor so as to avoid the failure of the related parts connected to the output shaft of the brake motor.

However, the electric brake device of the above publication requires a complicated structure and a relatively high cost due to the use of the mechanical clutch. According to the above publication, it is difficult to construct a simple, inexpensive electric brake device which is reliable in preventing the excessive reverse rotation of the brake motor.

SUMMARY OF THE INVENTION

An object of the present invention is to provide an improved electric brake device in which the above-described problems are eliminated.

Another object of the present invention is to provide an electric brake device which is reliable in preventing the excessive reverse rotation of the brake motor while having a simple, inexpensive construction.

The above-mentioned objects of the present invention are achieved by an electric brake device which includes: a disc rotor which is rotatable together with a wheel of an automotive vehicle; an output rod which is provided to press a friction pad onto the disc rotor so as to exert a braking force on the wheel; a brake motor which is provided to generate a rotating force in response to an electric signal; a gear mechanism which is provided to axially move the output rod relative to the disc rotor in accordance with the rotating force, such that the output rod is moved toward the disc rotor when the brake motor rotates in a forward direction, and that the output rod is separated from the disc rotor when the brake motor rotates in a reverse direction; a load detection unit which detects a load acting on an end of the output rod opposite to a position where the output rod presses the friction pad onto the disc rotor; and a motor deceleration unit which decreases the rate of rotation of the brake motor when the load detected by the load detection unit is above a reference level.

The above-mentioned objects of the present invention are achieved by an electric brake device which includes: a disc rotor which is rotatable together with a wheel of an automotive vehicle; an output rod which is provided to press a friction pad onto the disc rotor so as to exert a braking force on the wheel; a brake motor which is provided to generate a rotating force in response to an electric signal; a gear mechanism which is provided to axially move the output rod relative to the disc rotor in accordance with the rotating force, such that the output rod is moved toward the disc rotor when the brake motor rotates in a forward direction, and the output rod is separated from the disc rotor when the brake motor rotates in a reverse direction; a sensor which is provided to output a signal indicative of a rotational angle of a rotation shaft, the rotation shaft being rotated by the brake motor and connected to the output rod; and a motor control unit which decreases the rate of rotation of the brake motor when the brake motor rotates in the reverse direction and the rotational angle indicated by the output signal of the sensor is above a reference angle, and continues the rotation of the brake motor when the brake motor rotates in the reverse direction and the rotational angle indicated by the output signal of the sensor is below the reference angle.

In the electric brake device of the present invention, the gear mechanism axially moves the output rod relative to the disc rotor in accordance with the rotating force of the brake motor. The output rod is moved toward the disc rotor when the brake motor rotates in the forward direction, and the output rod is separated from the disc rotor when the brake motor rotates in the reverse direction. The load detection unit detects a load acting on the end of the output rod opposite to the position where the output rod presses the friction pad onto the disc rotor. The motor deceleration unit decreases the rate of rotation of the brake motor when the load detected by the load detection unit is above the reference level. When the detected load is larger than the reference level, it is determined that the output rod interferes with some related parts due to excessive reverse rotation of the brake motor. As the rate of rotation of the brake motor is decreased under such a condition, the electric brake device of the present invention is effective in preventing the excessive reverse rotation of the brake motor. The electric brake device of the present invention requires only the load detection unit and the motor deceleration unit, and the mechanical clutch as in the conventional device of the above publication is not needed. The electric brake device of the present invention is effective in providing a simple, inexpensive construction.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
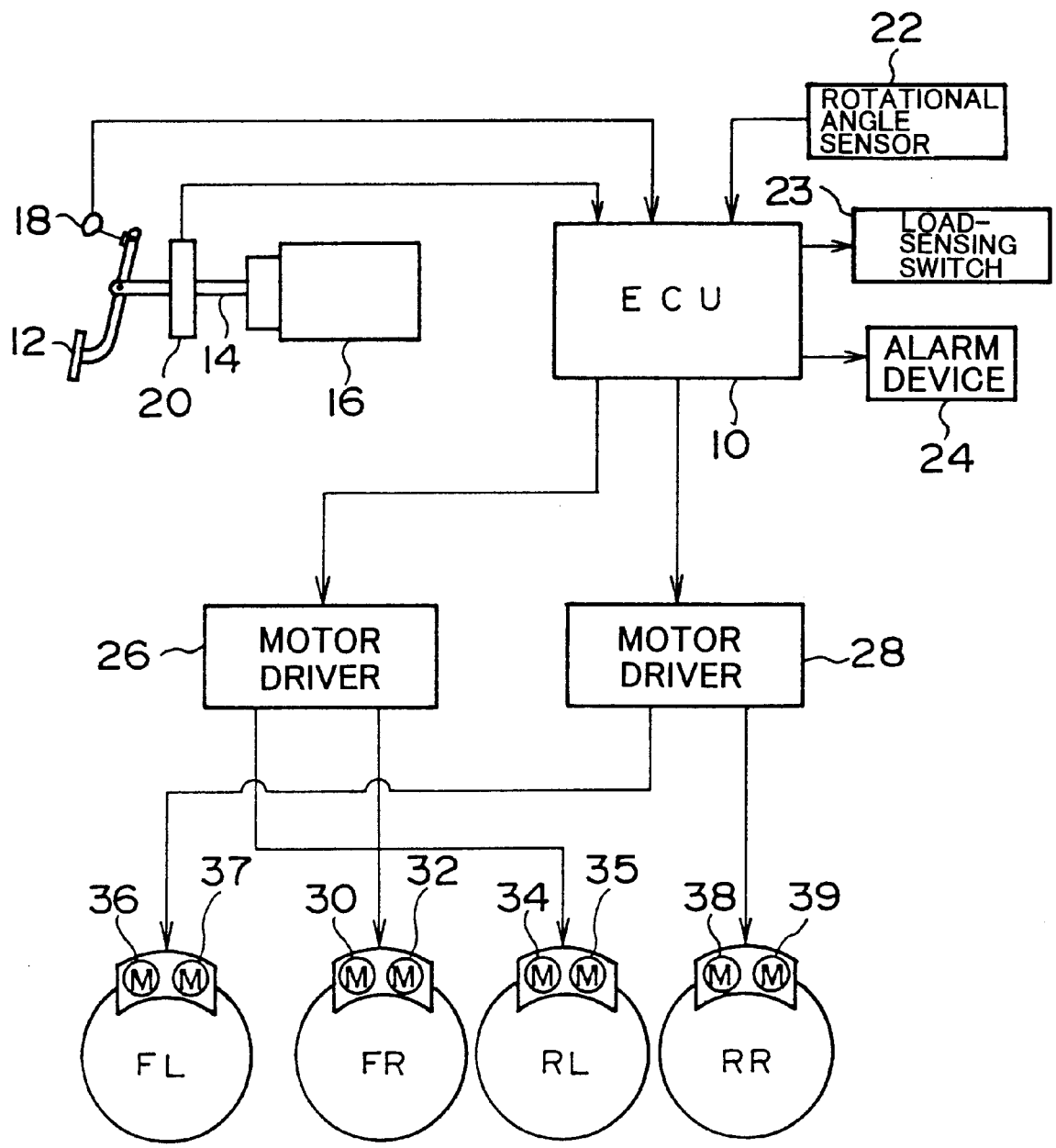
FIG. 1 is a system block diagram of an electric brake device embodying the present invention.

FIG. 1 shows an electric brake device embodying the present invention. As shown in FIG. 1, the electric brake device of the present invention includes an electric control unit (ECU) 10 (hereinafter called the ECU 10). The electric brake device of the present embodiment is controlled by the ECU 10 so that a braking force responsive to a brake operating amount is exerted on a vehicular wheel.

The electric brake device of FIG. 1 is provided with a brake pedal 12. The brake pedal 12 is connected through an operating shaft 14 to a stroke simulator 16. When the brake pedal 12 is depressed by a vehicle operator, the operating shaft 12 is moved into the stroke simulator 16. The stroke simulator 16 generates a reaction proportional to the amount of the operating shaft 12 entering the stroke simulator 16. The reaction is exerted by the stroke simulator 16 against the brake pedal 12.

A brake pedal switch 18 is provided at a position adjacent to the brake pedal 12. When the brake pedal 12 is depressed by the vehicle operator, the brake pedal switch 18 is turned from an OFF state to an ON state, and outputs an ON-state signal to the ECU 10. Otherwise the brake pedal switch 18 is maintained in the OFF-state condition. The ECU 10 determines whether the brake pedal 12 is depressed by the vehicle operator, based on the signal output by the brake pedal switch 18.

A brake stroke sensor 20 is provided on the operating shaft 14. The brake stroke sensor 20 outputs a signal indicative of an amount of the stroke of the brake pedal 12 by the vehicle operator. The output signal of the brake stroke sensor 20 is supplied to the ECU 10. The ECU 10 determines the amount of the stroke of the brake pedal 12 based on the signal output by the brake stroke sensor 20.

In the electric brake device of the present embodiment, a rotation shaft (not shown in FIG. 1) is provided in a disc brake which will be described later. A rotational angle sensor 22 is provided around an outer periphery of the rotation shaft, and the rotational angle sensor 22 is connected at its output to the ECU 10 as shown in FIG. 1. The rotational angle sensor 22 outputs a signal indicative of a rotational angle of the rotation shaft relative to a reference position on the rotation shaft. The signal output by the rotational angle sensor 22 is supplied to the ECU 10. The ECU 10 determines a rotational angle $\theta$ of the rotation shaft relative to the reference position based on the output signal of the rotational angle sensor 22.

In the electric brake device of FIG. 1, the ECU 10 is connected to a motor driver 26 and to a motor driver 28. The motor driver 26 is connected to a first brake motor 30 and a second brake motor 32, both provided on a front-right (FR) wheel of an automotive vehicle, and to a first brake motor 34 and a second brake motor 35, both provided on a rear-left (RL) wheel of the vehicle. The motor driver 28 is connected to a first brake motor 36 and a second brake motor 37, both provided on a front-left (FL) wheel of the vehicle, and to a first brake motor 38 and a second brake motor 39, both provided on a rear-right (RR) wheel of the vehicle.

The ECU 10 supplies a control signal to the motor driver 26 based on the output signal of the stroke sensor 20. The motor driver 26 controls the first brake motors 30 and 34 and the second brake motors 32, and 35 in accordance with the control signal. Similarly, the ECU 10 supplies a control signal to the motor driver 28 based on the output signal of the stroke sensor 20. The motor driver 28 controls the first brake motors 36 and 38 and the second brake motors 37 and 39 in accordance with the control signal.

In the electric brake device of FIG. 1, a disc brake including a first brake motor and a second brake motor is provided with respect to each of the FL, FR, RL and RR wheels of the vehicle. The disc brake generates a braking force on the related wheel, in accordance with operating conditions of the first and second brake motors. These disc brakes of the FL, FR, RL and RR wheels are identical to each other. In the following, a description of one of the disc brakes in the electric brake device of FIG. 1 will be given, and a duplicate description of the other disc brakes will be omitted.

Figure 2:
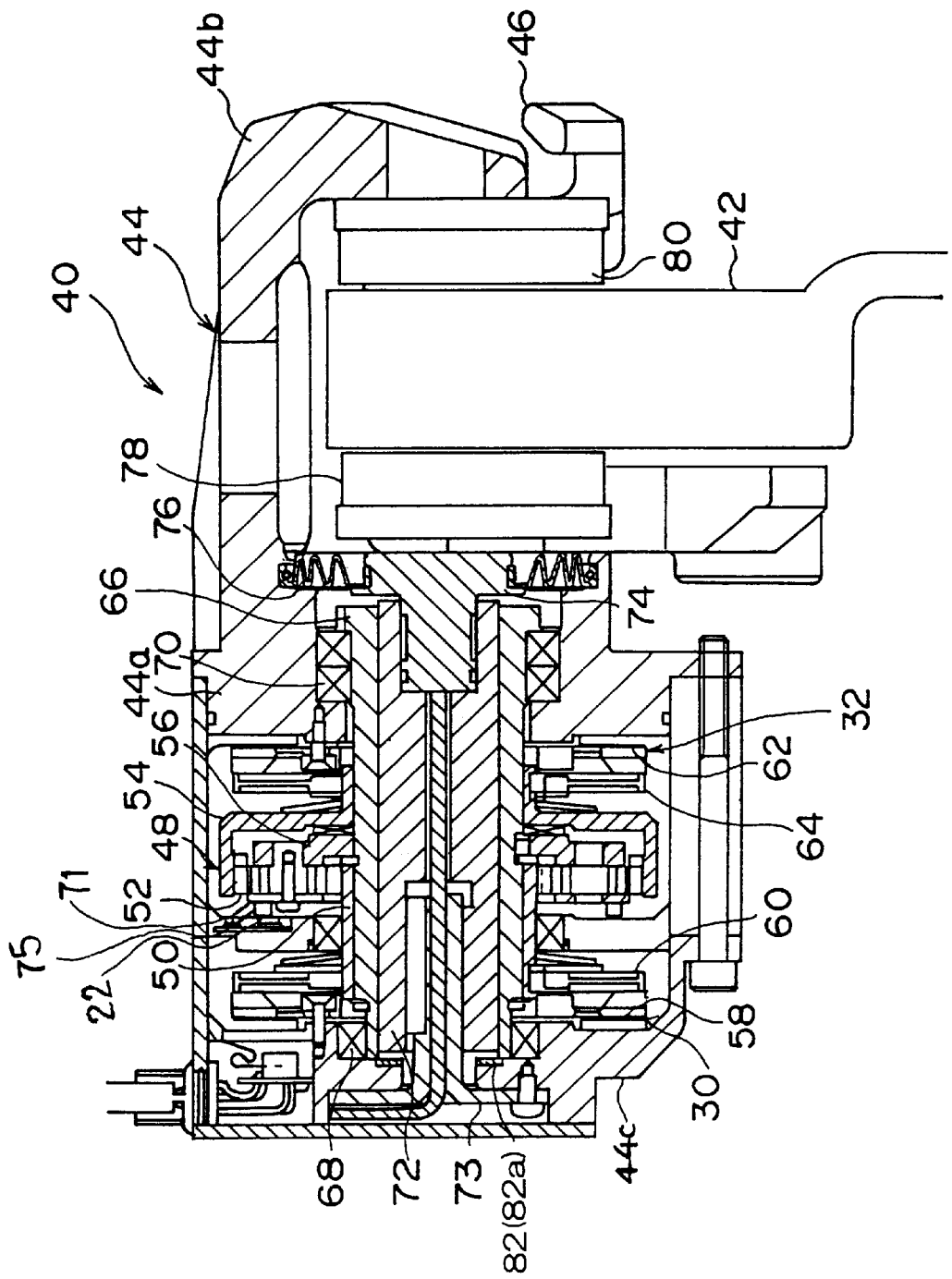
FIG. 2 is a cross-sectional view of a disc brake in the electric brake device.

FIG. 2 is a cross-sectional view of a disc brake 40 in the electric brake device of the present embodiment. For the sake of simplicity of description, suppose that the disc brake 40 is provided on the FR wheel of the vehicle.

In the disc brake 40 of FIG. 2, the first brake motor 30 and the second brake motor 32 are provided. The disc brake 40 is provided with a disc rotor 42 which is rotatable together with the FR wheel of the vehicle. The disc brake 40 includes a caliper 44 on the outer periphery of the disc rotor 42. A mounting bracket 46 is fixed to the vehicle, and the caliper 44 is movably supported on the mounting bracket 46. The caliper 44 is movable in an axial direction of the disc rotor 42.

The caliper 44 is provided with a planetary gear drive 48. The planetary gear drive 48 includes a sun gear 50, a plurality of planet gears 52, a ring gear 54, and a carrier 56. The planet gears 52 are connected with the sun gear 50. The ring gear 54 is arranged coaxially with the sub gear 50, and the ring gear 54 is connected with the planet gears 52. The planet gears 52 are fitted to the carrier 56 such that rotational positions of the planet gears 52 around a central axis of the sun gear 50 relative to each other are maintained at a given distance.

The caliper 44 includes a mounting portion 44a and a mounting portion 44c. The first brake motor 30 is fixed to the mounting portion 44c, and the second brake motor 32 is fixed to the mounting portion 44a. The planetary gear drive 48 is interposed between the first brake motor 30 and the second brake motor 32. In the present embodiment, each of the first brake motor 30 and the second brake motor 32 may be constituted by an ultrasonic type motor. The first brake motor 30 includes a piezoelectric element 58 and a rotor 60. The piezoelectric element 58 is made of, for example, lead zirconate titanate (PZT). The piezoelectric element 58 acts to generate a rotating force in response to an electric current passed through the piezoelectric element 58, and the rotor 60 is rotated by the rotating force generated by the piezoelectric element 58. Similarly, the second brake motor includes a piezoelectric element 62 and a rotor 64. The piezoelectric element 62 acts to generate a rotating force in response to an electric current passed through the piezoelectric element 62, and the rotor 64 is rotated by the rotating force by the piezoelectric element 62.

When no electric current is supplied to the piezoelectric elements 58 and 62, the rotors 60 and 64 of the first and second brake motors 30 and 32 are not rotated by the piezoelectric elements 58 and 62. The rotation of the rotors 60 and 64 is inhibited by a frictional force exerted on the rotors 60 and 64. When the electric current is supplied to the piezoelectric elements 58 and 62, the rotors 60 and 64 of the first and second brake motors 30 and 32 are rotated by the rotating force by the piezoelectric elements 58 and 62.

In the disc brake 40 of FIG. 2, the rotor 60 of the first brake motor 30 is linked to the sun gear 50, and the rotor 64 of the second brake motor 32 is linked to the ring gear 54. The first brake motor 30 acts as a power source which rotates the sun gear 50 around the central axis of the sun gear 50. The second brake motor 32 acts as a power source which rotates the ring gear 54 around the central axis of the sun gear 50. As the planet gears 52 are connected to both the sun gear 50 and the ring gear 54, the planet gears 52 are rotated around the central axis of the sun gear 50 in accordance with the rotation of the sun gear 50 and the ring gear 54. As the planet gears 52 are fixed to the carrier 56, the carrier 56 is rotated around the central axis of the sun gear 50 together with the planet gears 52.

In the disc brake 40 of FIG. 2, the rotation shaft 66 is linked to the carrier 56. The rotation shaft 66 is constituted by a cylindrical member, and the rotation shaft 66 is arranged coaxially with the sun gear 50. The rotation shaft 66 is rotatably supported on the mounting portions 44a and 44c of the caliper 44 via bearings 70 and 68. The bearings 68 and 70 function to prevent movement of the rotation shaft 66 in an axial direction of the rotation shaft 66 when the rotation shaft 66 is rotated around the central axis of the sun gear 50 by the carrier 56.

A link plate 71 is provided on the outer periphery of the rotation shaft 66. A ring-form magnet 75 is fixed to the link plate 71. Hence, the ring-form magnet 75 is rotated together with the rotation shaft 66 when the rotation shaft 66 is rotated. In the ring-form magnet 75, the N poles and the S poles are alternately arranged on the periphery of the ring-form magnet 75 such that they are equally spaced around the center of the magnet 75. The rotational angle sensor 22 is provided on the mounting portion 44a of the caliper 44 at a position where the sensor 22 confronts the magnet 75. The rotational angle sensor 22 in the present embodiment is constituted by a hall element. Magnetic flux lines from the magnet 75 pass through the rotational angle sensor 22 via an air gap between the magnet 75 and the sensor 22. For each revolution of the rotation shaft 66, the rotational angle sensor 22 is subjected to a periodic change (or a sinusoidal waveform) of the polarity of the magnetic flux from the magnet 75. The rotational angle sensor 22 outputs a pulsed signal in accordance with the change of the polarity of the magnetic flux from the magnet 75 when the rotation shaft 66 is rotated. The signal output by the rotational angle sensor 22 is indicative of a rotational angle of the rotation shaft 66 relative to the reference position on the rotation shaft 66. The signal output by the rotational angle sensor 22 is supplied to the ECU 10. The ECU 10 determines a rotational angle θ of the rotation shaft 66 relative to the reference position based on the output signal of the rotational angle sensor 22.

An output rod 72 is arranged on the inner surface of the rotation shaft 66 coaxially with the rotation shaft 66. The output rod 72 is linked through a ball thread to the rotation shaft 66. A supporting member 73 is fixed to the mounting portion 44c of the caliper 44. The output rod 72 is supported by the supporting member 73 such that the output rod 72 is not rotatable around the central axis of the rotation shaft 66, but it is axially movable along the rotation shaft 66 according to the rotation of the rotation shaft 66. That is, the output rod 72 is axially moved along the rotation shaft 66 in accordance with the rotational angle θ of the rotation shaft 66. The ECU 10 determines an estimated position of the output rod 72 relative to the rotation shaft 66 in the axial direction based on the determined rotational angle θ of the rotation shaft 66.

The caliper 44 is provided with a pressing member 74, and the pressing member 74 includes a rod portion and a flange portion. The flange portion of the pressing member 74 is fixed to the mounting portion 44a of the caliper 44 via a sealing member 76. The sealing member 76 is constituted by an elastic material. The sealing member 76 has a resilient characteristic and acts to allow the pressing member 74 to be movable relative to the mounting portion 44a of the caliper 44 in the axial direction of the rotation shaft 66. The rod portion of the pressing member 74 is fitted into the inner surface of the output rod 72 such that the rod portion of the pressing member 74 is slidable on the inner surface of the output rod 72. When the flange portion of the pressing member 74 is pressed by the output rod 72, the pressing member 74 is moved relative to the mounting portion 44a in the axial direction (the right direction in FIG. 2).

A friction pad 78 is fixed to the pressing member 74 such that the friction pad 78 confronts the left-side surface of the disc rotor 42. The caliper 44 includes a reaction portion 44b on the other side of the disc rotor 42. A friction pad 80 is fixed to the reaction portion 44*b* of the caliper 44 such that the friction pad 80 confronts the right-side surface of the disc rotor 42. The caliper 44, the friction pads 78 and 80 and the disc rotor 42 are arranged such that, when the flange portion of the pressing member 74 is pressed by the output rod 72, the friction pad 78 exerts the right pressing force on the disc rotor 42 and the friction pad 80 exerts the left pressing force on the disc rotor 42. As the disc rotor 42 is rotated together with the FR wheel of the vehicle, a braking force exerted on the vehicular wheel is generated by the disc brake 40 at this time.

In the disc brake 40 of FIG. 2, a pressure-sensitive rubber 82 is provided at an end of the output rod 72 opposite to the position where the pressing member 74 is fitted to the output rod 72. The pressure-sensitive rubber 82 is formed into an annular member. A corresponding annular groove is formed on the mounting portion 44*c* of the caliper 44. The pressure-sensitive rubber 82 is fitted to the annular groove of the mounting portion 44*c*, and the rubber 82 is fixed to the mounting portion 44*c* by using an adhesive agent. A resistance detection circuit is electrically connected to the pressure-sensitive rubber 82, and this resistance detection circuit acts to detect a resistance "R" of the pressure-sensitive rubber 82. The resistance detection circuit includes a DC power supply and an ammeter. This ammeter outputs a signal indicative of a current passed through the pressure-sensitive rubber 82 in the resistance detection circuit. The signal output by the ammeter is supplied to the ECU 10. The ECU 10 determines a resistance "R" of the pressure-sensitive rubber 82 based on a source voltage supplied by the DC power supply and the signal output by the ammeter.

Referring back to FIG. 1, the ECU 10 is connected to a load-sensing switch 23 and to an alarm device 24. When the resistance "R" of the pressure-sensitive rubber 82 is less than a predetermined reference value, the ECU 10 outputs an ON-signal to the load-sensing switch 23, so that the load-sensing switch 23 is set to an ON state. When a malfunction occurs in the rotational angle sensor 22 or the pressure-sensitive rubber 82, the ECU 10 outputs an ON-signal to the alarm device 24 in accordance with a predetermined malfunction diagnostic scheme, so that the alarm device 24 is set to an ON state, which calls the attention of the vehicle operator to the malfunction.

In the disc brake 40 of FIG. 2, when the first brake motor 30 and the second brake motor 32 are not actuated, the planet gears 52 are maintained in the initial positions. In this condition, a certain clearance between the pressure-sensitive rubber 82 and the output rod 72 is retained. When the brake pedal 12 is depressed by the vehicle operator, the ECU 10 detects an amount of the stroke of the brake pedal 12 based on the output signal of the stroke sensor 20. In response to the brake pedal depression, the ECU 10 controls the first and second brake motors 30 and 32 through the motor driver 26, such that an appropriate braking force is exerted on the FR wheel of the vehicle.

In the disc brake 40 of FIG. 2, when the first brake motor 30 is actuated, the sun gear 50 is rotated around the central axis of the sun gear 50 by the first brake motor 30. When the second brake motor 32 is actuated, the ring gear 54 is rotated around the central axis of the sun gear 50 by the second brake motor 32. When the sun gear 50 and the ring gear 54 are rotated, the rotation of the planet gears 52 around the central axis of the sun gear 50 is started. When the planet gears 52 are rotated, the carrier 56 fixed to the planet gears 52 is also rotated around the central axis of the sun gear 50. As the rotation shaft 66 is linked to the carrier 56, the rotation shaft 66 is rotated when the carrier 56 is rotated. As described above, the output rod 72 is linked through the ball thread to the rotation shaft 66. The output rod 72 is axially moved along the rotation shaft 66 according to the rotation of the rotation shaft 66.

When the output rod 72 is axially moved toward the disc rotor 42, the pressing member 74 is moved together with the output rod 72 so as to press the friction pad 78 onto the disc rotor 42. At this time, the friction pad 78 presses the disc rotor 42 in the right direction and the friction pad 80 presses the disc rotor 42 in the left direction. As the disc rotor 42 is rotated together with the FR wheel of the vehicle, a braking force exerted on the FR wheel is generated by the disc brake 40. Hereinafter, the direction of the rotation of the first brake motor 30, the second brake motor 32, the planet gears 52 and the rotation shaft 66, in which the braking force is increased, will be called the forward direction.

When the depression of the brake pedal 12 is canceled under a condition in which the braking force is generated, the ECU 10 controls the first and second brake motors 30 and 32 through the motor driver 26 such that the braking force on the wheel is canceled. The rotation of the first and second brake motors 30 and 32 is transferred to the sun gear 50, the ring gear 54, the planet gears 52, the carrier 56, the rotation shaft 66 and the output rod 72.

When the output rod 72 is axially moved away from the disc rotor 42, the friction pads 78 and 80 are separated from the disc rotor 42 so as to reduce the braking force on the FR wheel of the vehicle. When the axial movement of the output rod 72 continues over a certain period, the friction pads 78 and 80 are completely separated from the disc rotor 42, so that the braking force on the FR wheel is canceled. Hereinafter, the direction of the rotation of the first brake motor 30, the second brake motor 32, the planet gears 52 and the rotation shaft 66, in which the braking force is decreased, will be called the reverse direction.

In the disk brake 40 of FIG. 2, if a clearance between the friction pads 78 and 80 and the disc rotor 42 exceeds a certain level, the speed of response of the disk brake 40 to the brake pedal depression by the vehicle operator will be degraded. In order to avoid the degradation of the response speed, it is necessary that the friction pads 78 and 80 are retained at appropriate positions relative to the disc rotor 42 after the braking force on the wheel is canceled and the axial movement of the output rod 72 is terminated. To eliminate the above problem, it is necessary to decrease the rate of rotation of both the first brake motor 30 and the second brake motor 32 when the output rod 72 is axially moved away from the disc rotor 42 and reaches a permissible limit position, or when the rotation shaft 66 is rotated in the reverse direction and the rotational angle of the rotation shaft 66 relative to the reference position reaches a permissible limit angle.

Figure 3:
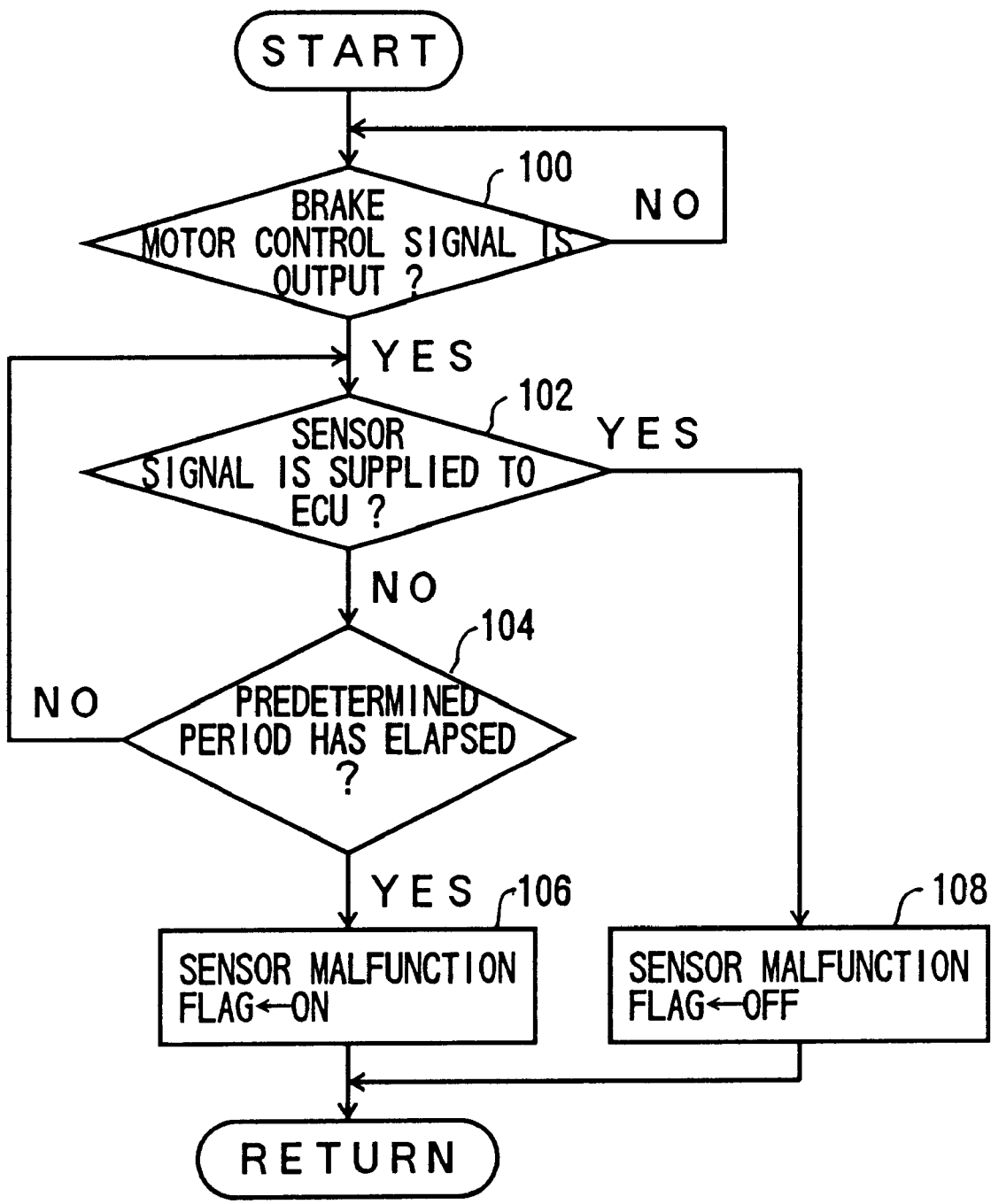
FIG. 3 is a flowchart for explaining a sensor malfunction detection routine executed by the electric brake device.
Figure 4:
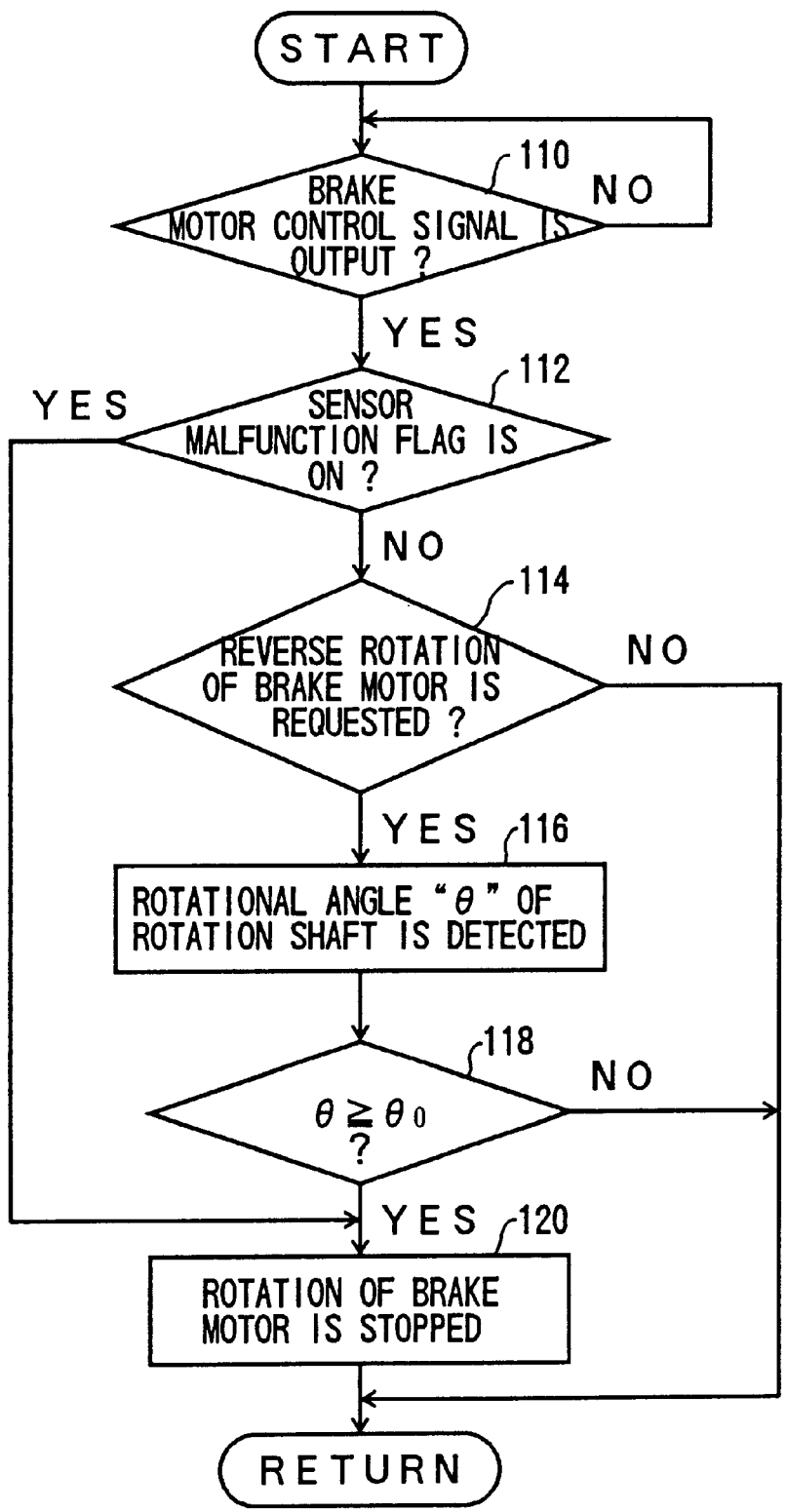
FIG. 4 is a flowchart for explaining a main routine executed by the electric brake device.

FIG. 3 shows a sensor malfunction detection routine executed by the electric brake device of FIG. 1. FIG. 4 shows a main routine executed by the electric brake device of FIG. 1. These routines are executed by the ECU 10 of the electric brake device in order to attain the above-mentioned function.

The sensor malfunction detection routine of FIG. 3 is carried out in order to determine whether a malfunction occurs in the rotational angle sensor 22. The execution of this routine is periodically initiated at intervals of a predetermined time.

At the start of the sensor malfunction detection routine of FIG. 3, the ECU 10 at step 100 determines whether a brake motor control signal is output to the motor driver 26 (or the motor driver 28) so as to drive the first and second brake motors 30 and 32. The step 100 is repeated until it is determined that the brake motor control signal is output to the motor driver 26 by the ECU 10.

When the result at the step 100 is affirmative, the ECU 10 at step 102 determines whether a signal output by the rotational angle sensor 22 is supplied to the ECU 10. When the result at the step 102 is negative, the ECU 10 performs step 104. On the other hand, when the result at the step 102 is affirmative, the ECU 10 performs step 108.

The ECU 10 at step 104 determines whether a predetermined period has elapsed after it is determined at the step 102 that the output signal of the rotational angle sensor 22 is not supplied. When the result at the step 104 is negative, the above step 102 is repeated. On the other hand, when the result at the step 104 is affirmative, it is determined that a malfunction occurs in the rotational angle sensor 22. In this case, the ECU 10 performs step 106.

The ECU 10 at step 106 sets a sensor malfunction flag of the rotational angle sensor 22 to an ON state. When the sensor malfunction flag is set to the ON state, it indicates that a malfunction occurs in the rotational angle sensor 22. That is, it means that the output signal of the rotational angle sensor 22 does not indicate an accurate rotational angle of the rotation shaft 66. After the step 106 is performed, the execution of this routine at this cycle is terminated.

The ECU 10 at step 108 sets the sensor malfunction flag of the rotational angle sensor 22 to an OFF state. After the step 108 is performed, the execution of this routine at this cycle is terminated.

According to the sensor malfunction detection routine of FIG. 3, when the output signal of the rotational angle sensor 22 is not supplied to the ECU 10 over the predetermined period after the brake motor control signal is output, the sensor malfunction flag is set to the ON state. It is necessary to stop the rotation of the first and second brake motors 30 and 32 when the sensor malfunction flag is set to the ON state.

The main routine of FIG. 4 is carried out in order to stop the rotation of the first and second brake motors 30 and 32 when the rotation shaft 66 is rotated in the reverse direction and the rotational angle of the rotation shaft 66 relative to the reference position reaches a permissible limit angle. The execution of this routine is periodically initiated at intervals of a predetermined time.

At the start of the main routine of FIG. 4, the ECU 10 at step 110 determines whether a brake motor control signal is output to the motor driver 26 (or the motor driver 28) so as to drive the first and second brake motors 30 and 32. The step 110 is repeated until it is determined that the brake motor control signal is output to the motor driver 26 by the ECU 10.

When the result at the step 110 is affirmative, the ECU 10 at step 112 determines whether the sensor malfunction flag of the rotational angle sensor 22 is in the ON state. The ON/OFF state of the sensor malfunction flag depends on the result of the sensor malfunction detection routine of FIG. 3. When the result at the step 112 is affirmative, it is determined that a malfunction occurs in the rotational angle sensor 22. The ECU executes step 120. On the other hand, when the result at the step 112 is negative, it is determined that the rotational angle sensor 22 is normally operating. The ECU 10 executes step 114.

The ECU 10 at step 114 determines whether the reverse rotation of the first and second brake motors 30 and 32 is requested by the brake motor control signal. When the reverse rotation of the first and second brake motors 30 and 32 is requested (or the result at the step 114 is affirmative), the ECU 10 executes step 116. On the other hand, when the reverse rotation of the first and second brake motors 30 and 32 is not requested (or the result at the step 114 is negative), the main routine of FIG. 4 at this cycle is terminated without executing the subsequent steps.

The ECU 10 at step 116 determines a rotational angle "$\theta$" of the rotation shaft 66 relative to the reference position based on the output signal of the rotational angle sensor 22. The reference position is defined by an appropriate position of the rotation shaft 66 where a predetermined clearance between the friction pads 78 and 80 and the disc rotor 42 is retained.

After the step 116 is performed, the ECU 10 at step 118 determines whether the rotational angle "$\theta$" of the rotation shaft 66 relative to the reference position is above a predetermined reference angle "$\theta o$" ($\theta \geq \theta o$). The reference angle "$\theta o$" is defined by an appropriate rotational angle of the rotation shaft 66 where a predetermined clearance between the friction pads 78 and 80 and the disc rotor 42 is retained.

When $\theta \geq \theta o$ (the result at the step 118 is affirmative), it is determined that the output rod 72 is about to be axially moved away from the disc rotor 42 beyond the permissible limit position. The ECU 10 executes step 120. On the other hand, when $\theta < \theta o$ (the result at the step 118 is negative), it is determined that the output rod 72 is not yet axially moved away from the disc rotor 42 beyond the permissible limit position. The execution of this routine at this cycle is terminated.

The ECU 10 at step 120 stops the rotation of the first and second brake motors 30 and 32. The ECU 10 at this step outputs a brake motor stop signal to the motor driver 26 so as to stop the supply of the source current to the first and second brake motors 30 and 32. In this step 120, it is desirable to completely stop the rotation of these motors but it is not required to do so. Practically, the ECU 10 at this step 120 decreases the rate of rotation of the brake motors 30 and 32 by outputting the brake motor stop signal to the motor driver 26. After the step 120 is performed, the execution of the main routine of FIG. 4 at this cycle is terminated.

According to the main routine of FIG. 4, when the rotation shaft 66 is excessively rotated in the reverse direction beyond the reference angle "$\theta o$", the rotation of the first and second brake motors 30 and 32 can be stopped. As the rotation of the first and second brake motors 30 and 32 is stopped or the rate of rotation thereof is decreased, excessive rotation of the rotation shaft 66 in the reverse direction can be minimized. Hence, the electric brake device of the present embodiment is effective in preventing the axial movement of the output rod 72 away from the disc rotor 42 beyond the permissible limit position. The electric brake device of the present embodiment is effective in maintaining a speedy response of the disk brake 40 to the brake pedal depression of the vehicle operator.

However, when a malfunction occurs in the rotational angle sensor 22, there is a case in which the reverse rotation of the first and second brake motors 30 and 32 becomes excessive, due to the sensor malfunction, when the friction pads 78 and 80 are separated from the disc rotor 42. If the reverse rotation of the rotation shaft 66 becomes excessive, the axial movement of the output rod 72 away from the disc rotor 42 exceeds the permissible limit position. In such a condition, the related parts which are connected to the output rod 72 of the brake motor 40 may be damaged. In order to resolve the above problem, it is necessary to prevent the excessive reverse rotation of the first and second brake motors 30 and 32 so as to avoid the excessive axial movement of the output rod 72.

Next, a description will be given of another embodiment of the electric brake device of the present invention with reference to FIG. 5 through FIG. 7. The present embodiment of the electric brake device is provided in order to reliably prevent the excessive reverse rotation of the first and second brake motors 30 and 32 even when a malfunction occurs in the rotational angle sensor 22.

Figure 5:
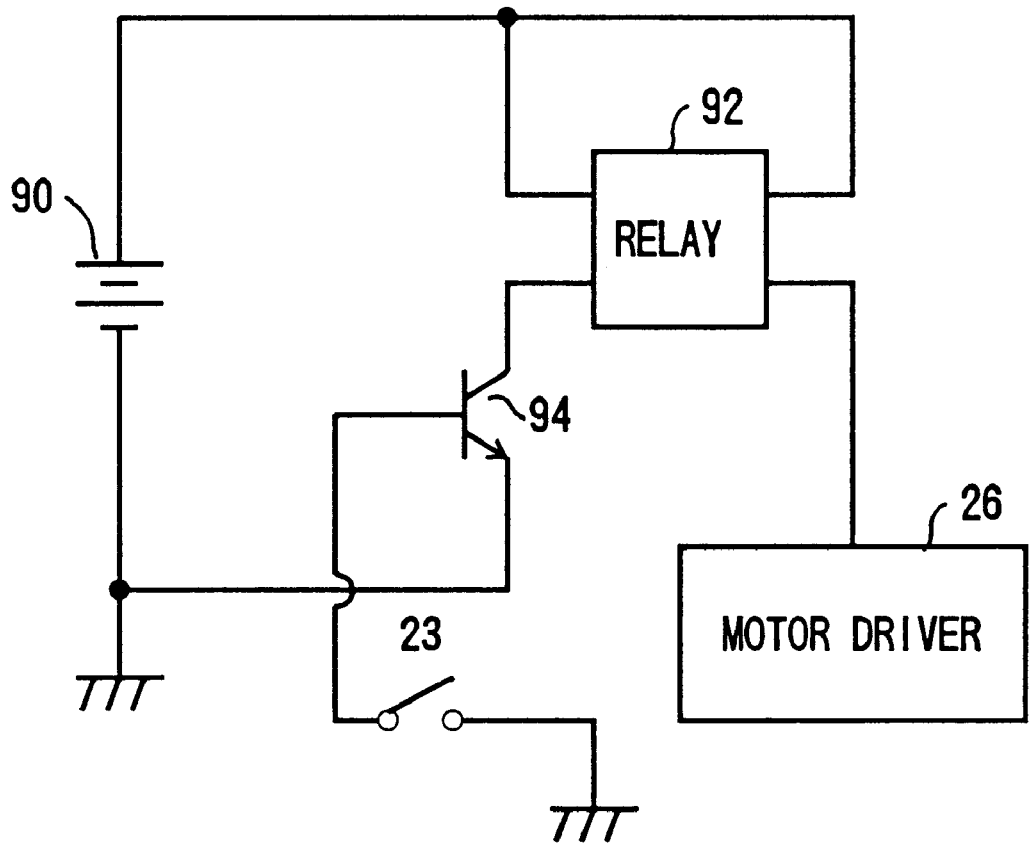
FIG. 5 is a circuit diagram of a reverse-rotation prevention circuit in another embodiment of the electric brake device of the present invention.

FIG. 5 shows a reverse-rotation prevention circuit in the electric brake device of the present embodiment. Other elements of the present embodiment are essentially the same as corresponding elements in the embodiment of FIG. 1 through FIG. 4, and a description thereof will be omitted.

The reverse-rotation prevention circuit of FIG. 5 is connected to the motor driver 26 in the electric brake device of FIG. 1. The motor driver 26 is connected to the first and second brake motors 30 and 32 of the disk brake 40. The motor driver 26 controls the first and second brake motors 30 and 32 in accordance with the control signal supplied by the ECU 10.

As shown in FIG. 5, the reverse-rotation prevention circuit includes a battery 90, a relay 92 and a transistor 94. The battery 90 acts to supply a source power to the first and second brake motors 30 and 32 through the relay 92 and the motor driver 26. The battery 90 has a negative terminal grounded. The relay 92 has an input connected to a positive terminal of the battery 90 and an input connected to a collector of the transistor 94. The relay 92 has an output connected to the positive terminal of the battery 90 and an output connected to the motor driver 26. The transistor 94 has an emitter grounded, and has a base connected to one end of the load-sensing switch 23. The other end of the load-sensing switch 23 is grounded.

As previously described, the ECU 10 determines a resistance "R" of the pressure-sensitive rubber 82 based on the output signal of the resistance detection circuit. Suppose that a source voltage supplied by the DC power supply of the resistance detection circuit is known. When the resistance "R" of the pressure-sensitive rubber 82 is less than the predetermined reference value, the ECU 10 outputs an ON-signal to the load-sensing switch 23, so that the load-sensing switch 23 is set to the ON state. When the load-sensing switch 23 is turned ON, the relay 92 is set to an OFF state. On the other hand, when the resistance "R" of the pressure-sensitive rubber 82 is above the predetermined reference value, the ECU 10 outputs an OFF-signal to the load-sensing switch 23, so that the load-sensing switch 23 is set to an OFF state. When the load-sensing switch 23 is turned OFF, the relay 92 is set to an ON state.

In the reverse-rotation prevention circuit of FIG. 5, the relay 92 is connected at the outputs to the motor driver 26 and to the positive terminal of the battery 90. When the relay 92 is set to the OFF state, the supply of the source power from the battery 90 to the first and second brake motors 30 and 32 is stopped. On the other hand, when the relay 90 is set to the ON state, the supply of the source power from the battery 90 to the first and second brake motors 30 and 32 is maintained. In the latter case, the motor driver 26 controls the first and second brake motors 30 and 32 in accordance with the control signal supplied by the ECU 10 while the source power of the battery 90 is supplied to the first and second brake motors 30 and 32.

Figure 6:
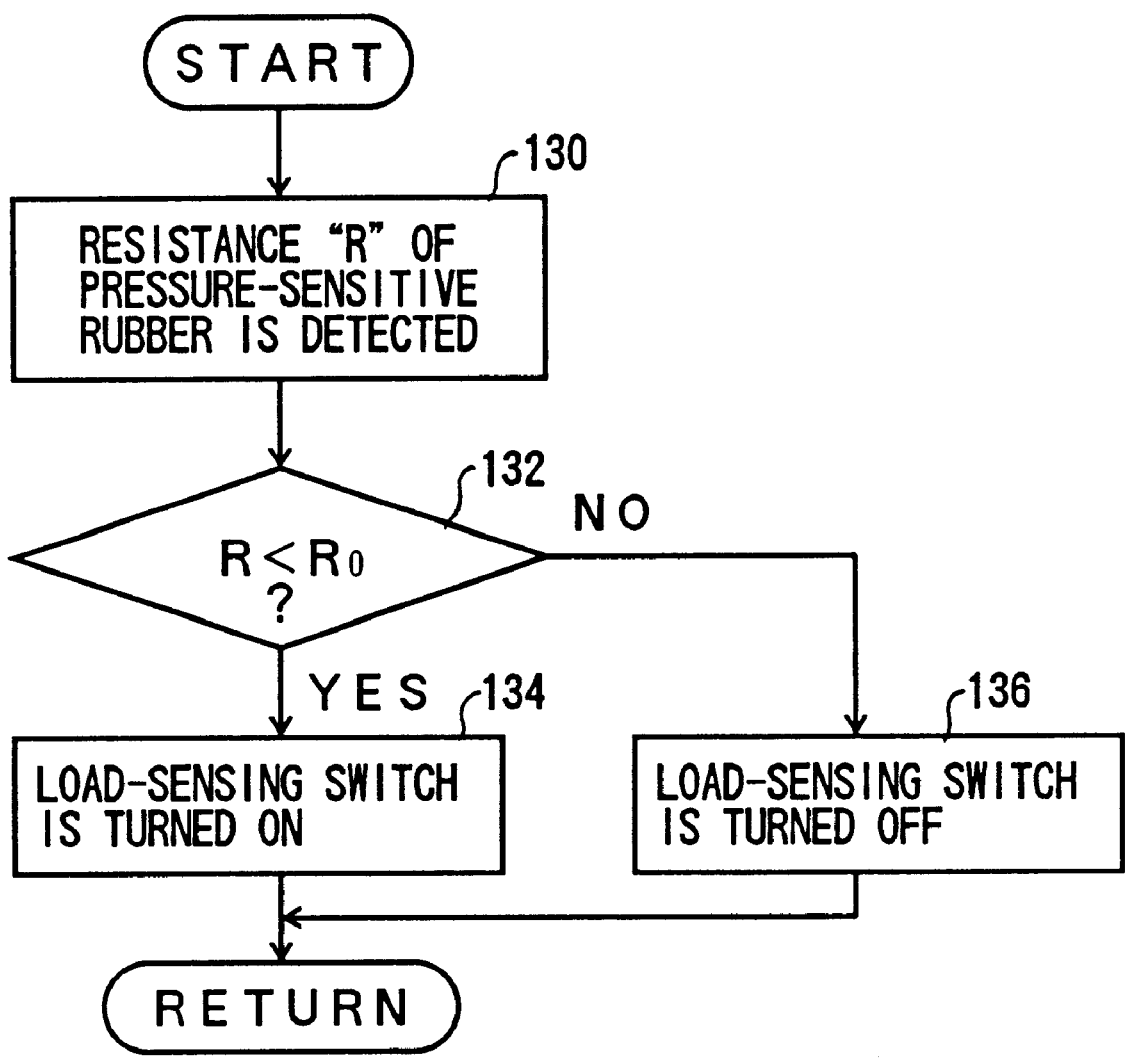
FIG. 6 is a flowchart for explaining a load-sensing switch control routine executed by the electric brake device.

FIG. 6 shows a load-sensing switch control routine executed by the ECU 10 of the electric brake device of the present embodiment.

The load-sensing switch control routine of FIG. 6 is carried out in order to determine whether the supply of the source power from the battery 90 to the first and second brake motors 30 and 32 is stopped or maintained. The execution of this routine is periodically initiated at intervals of a predetermined time.

At the start of the routine of FIG. 6, the ECU 10 at step 130 determines a resistance "R" of the pressure-sensitive rubber 82 based on the output signal of the resistance detection circuit. Suppose that a source voltage supplied by the DC power supply of the resistance detection circuit is known.

After the step 130 is performed, the ECU 10 at step 132 determines whether the resistance "R" of the pressure-sensitive rubber 82 is less than a predetermined reference value "Ro" (R<Ro). The reference value "Ro" is defined by a resistance of the pressure-sensitive rubber 82 when the output rod 72 is in contact with the rubber 82 under a smallest sensitive load.

Figure 7:
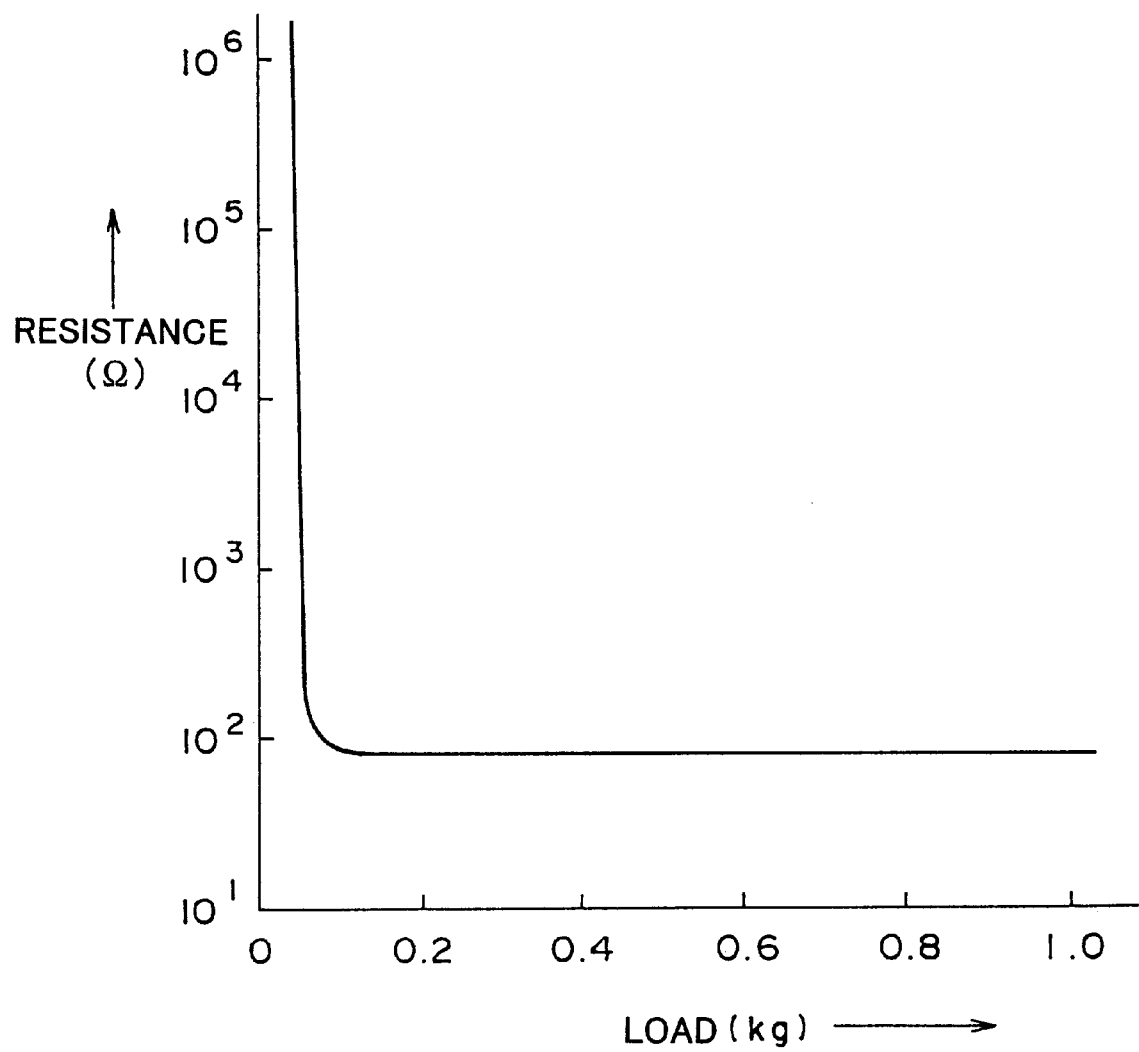
FIG. 7 is a diagram for explaining a load vs resistance relationship of a pressure-sensitive rubber in the electric brake device.

FIG. 7 shows a load vs resistance relationship of a pressure-sensitive rubber 82 in the electric brake device of the present embodiment.

As shown in FIG. 7, the load acting on the pressure-sensitive rubber 82 is very small when the resistance of the pressure-sensitive rubber 82 is larger than 100Ω. The load acting on the pressure-sensitive rubber 82 is drastically increased when the resistance is around 100106 and less than 100Ω. Hence, in the present embodiment, the reference value "Ro" is set at 100Ω, and the determination as to whether the supply of the source power from the battery 90 to the first and second brake motors 30 and 32 is stopped or maintained is made by comparing the resistance "R" with this reference value "Ro" (=100Ω).

Referring back to FIG. 6, when the result at the step 132 is affirmative (R<Ro), it is determined that the supply of the source power from the battery 90 to the first and second brake motors 30 and 32 is stopped. The ECU 10 executes step 134. On the other hand, when the result at the step 132 is negative (R≧Ro), it is determined that the supply of the source power from the battery 90 to the first and second brake motors 30 and 32 is maintained. The ECU 10 executes step 136.

The ECU 10 at step 134 outputs an ON-signal to the load-sensing switch 23, so that the load-sensing switch 23 is set to the ON state. When the load-sensing switch 23 is turned ON, the relay 92 is set to the OFF state. Hence, the supply of the source power from the battery 90 to the first and second brake motors 30 and 32 is stopped due to the OFF state of the relay 92. After the step 134 is performed, the routine of FIG. 6 at this cycle is terminated.

The ECU 10 at step 136 outputs an OFF-signal to the load-sensing switch 23, so that the load-sensing switch 23 is set to the OFF state. When the load-sensing switch 23 is turned OFF, the relay 92 is set to the ON state. Hence, the supply of the source power from the battery 90 to the first and second brake motors 30 and 32 through the relay 92 is maintained. After the step 136 is performed, the routine of FIG. 6 at this cycle is terminated.

According to the load-sensing switch control routine of FIG. 6, when the load acting on the pressure-sensitive rubber 82 is determined as being excessively large, the load-sensing switch 23 is set to the ON state. In the reverse-rotation prevention circuit of FIG. 5, when the load-sensing switch 23 is turned ON, the relay 92 is set to the OFF state, so that the supply of the source power from the battery 90 to the first and second brake motors 30 and 32 is stopped. That is, when the load-sensing switch 23 is turned ON, the rate of the reverse rotation of the first and second brake motors 30 and 32 is decreased. As the rate of the reverse rotation of the first and second brake motors 30 and 32 is decreased, excessive rotation of the rotation shaft 66 in the reverse direction can be minimized.

Hence, the electric brake device of the present embodiment is reliable in preventing the axial movement of the output rod 72 away from the disc rotor 42 beyond the permissible limit position. The electric brake device of the present embodiment is effective in preventing the damage of the related parts connected to the output rod 72 of the brake motor 40, due to the excessive axial movement of the output rod 72. Further, the electric brake device of the present embodiment requires only the load detection unit (the pressure-sensitive rubber 82 and the ECU 10) and the motor deceleration unit (the steps 132 and 134 executed by the ECU 10), and the mechanical clutch as in the conventional device of the above publication is not needed. The electric brake device of the present embodiment is effective in providing a simple, inexpensive construction.

The present invention is not limited to the above-described embodiments, and variations and modifications may be made without departing from the scope of the present invention.

For example, in the above-described embodiments, the pressure-sensitive rubber 82 is fixed to the mounting portion 44c of the caliper 44. Alternatively, the pressure-sensitive rubber 82 may be attached directly to the end of the output rod 72 opposite to the position where the pressing member 74 is fitted to the output rod 72. In such a modification, the rubber 82 on the end of the output rod 72 is pressed onto the mounting portion 44c of the caliper 44, producing a load acting on the rubber 82, and the resistance detection circuit connected to the rubber 82 outputs a signal indicative of a resistance of the rubber 82 in accordance with the load.

Further, in the above-described embodiments, the relay 92 is provided between the battery 90 and the motor driver 26, and, when the load-sensing switch 23 is turned ON, the relay 92 is set to the OFF state so that the supply of the source power from the battery 90 to the first and second brake motors 30 and 32 is stopped. According to the present invention, a means for stopping the supply of the source power to the first and second brake motors 30 and 32 is not limited to this embodiment. Alternatively, a relay unit which acts to stop the supply of the source power to the first and second brake motors 30 and 32 may be incorporated in the motor driver 26.

Further, in the above-described embodiments, the ECU 10 at the step 134 sets the load-sensing switch 23 to the ON state. In the reverse-rotation prevention circuit of FIG. 5, when the load-sensing switch 23 is turned ON, the relay 92 is set to the OFF state. Hence, the supply of the source power from the battery 90 to the first and second brake motors 30 and 32 is stopped due to the OFF state of the relay 92. Alternatively, the ECU 10 at the step 134 may output a brake motor stop signal to the motor driver 26 so as to stop the rotation of the first and second brake motors 30 and 32 or decrease the rate of rotation of these motors. In such a modification, the relay 92 and the transistor 94, provided between the battery 90 and the motor driver 26, may be omitted.

Further, in the above-described embodiments, the pressure-sensitive rubber 82 is provided at the end of the output rod 72 opposite to the position where the output rod 72 presses the friction pad 78 onto the disc rotor 42 in order to detect a load acting on the end of the output rod 72. Alternatively, a microswitch 82a, instead of the pressure-sensitive rubber 82, may be provided at the end of the output rod 72 (the same location as the rubber 82) as shown in FIG. 2.

The microswitch 82a includes two movable electrodes provided therein. When the two movable electrodes are in contact with each other due to a certain load acting on the end of the output rod 72, the microswitch 82a outputs an ON-state signal. Otherwise the microswitch 82a remains in an OFF state. In the above modification, the microswitch 82a outputs an ON-state signal when a load which is above a reference level (or a smallest sensitive load) acts on the end of the output rod 72. The ON-state signal output by the microswitch 82a is supplied to the ECU 10. The ECU 10 acts to stop the rotation of the first and second brake motors when the ON-state signal is output by the microswitch 82a. Alternatively, the ECU 10 may act to decrease the rate of rotation of these brake motors when the ON-state signal is output by the microswitch 82a. Hence, the above modification, including the microswitch 82a, can achieve the effects which are the same as those of the above-described embodiments.

Further, the present invention is based on Japanese priority application No.10-246255, filed on Aug. 31, 1998, the entire contents of which are hereby incorporated by reference.

What is claimed is:

1. An electric brake device comprising:
 a disc rotor which is rotatable together with a wheel of an automotive vehicle;
 an output rod provided to press a friction pad onto the disc rotor so as to exert a braking force on the wheel;
 a brake motor provided to generate a rotating force in response to an electric signal;
 a gear mechanism provided to axially move the output rod relative to the disc rotor in accordance with the rotating force, such that the output rod is moved toward the disc rotor when the brake motor rotates in a forward direction, and that the output rod is separated from the disc rotor when the brake motor rotates in a reverse direction;
 load detecting means for detecting a load acting on an end of the output rod opposite to a position where the output rod presses the friction pad onto the disc rotor; and
 motor deceleration means for decreasing the rate of rotation of the brake motor when the load detected by the load detecting means is above a reference level.

2. The electric brake device of claim 1, wherein the load detecting means comprises a pressure-sensitive rubber.

3. The electric brake device of claim 1, wherein the load detecting means comprises a pressure-sensitive rubber provided at the end of the output rod, and a resistance detection circuit connected to the pressure-sensitive rubber, the resistance detection circuit detecting a resistance of the pressure-sensitive rubber, and wherein the load detecting means detects a load acting on the end of the output rod based on the resistance detected by the resistance detection circuit.

4. The electric brake device of claim 1, wherein the load detecting means comprises a microswitch provided at the end of the output rod, the microswitch outputting an ON-state signal when a load which is above the reference level acts on the end of the output rod, and wherein the motor deceleration means decreases the rate of rotation of the brake motor when the ON-state signal is output by the microswitch.

5. The electric brake device of claim 1, wherein the motor deceleration means stops the rotation of the brake motor when the load detected by the load detecting means is above the reference level.

6. An electric brake device comprising:

a disc rotor which is rotatable together with a wheel of an automotive vehicle;

an output rod provided to press a friction pad onto the disc rotor so as to exert a braking force on the wheel;

a brake motor provided to generate a rotating force in response to an electric signal;

a gear mechanism provided to axially move the output rod relative to the disc rotor in accordance with the rotating force, such that the output rod is moved toward the disc rotor when the brake motor rotates in a forward direction, and the output rod is separated from the disc rotor when the brake motor rotates in a reverse direction;

a sensor provided to output a signal indicative of a rotational angle of a rotation shaft, the rotation shaft being rotated by the brake motor and connected to the output rod; and motor control means for decreasing the rate of rotation of the brake motor when the brake motor rotates in the reverse direction and the rotational angle indicated by the output signal of the sensor is above a reference angle, and the motor control means continuing the rotation of the brake motor when the brake motor rotates in the reverse direction and the rotational angle indicated by the output signal of the sensor is below the reference angle.

7. The electric brake device of claim 6, further comprising alarm control means for outputting an ON-signal to an alarm device when the brake motor continues to rotate and a malfunction occurs in the sensor, so that the alarm device is turned ON in order to call attention of a vehicle operator to the malfunction.

8. The electric brake device of claim 6, wherein the motor control means stops the rotation of the brake motor when the brake motor rotates in the reverse direction and the rotational angle indicated by the output signal of the sensor is above the reference angle.

* * * * *

UNITED STATES PATENT AND TRADEMARK OFFICE
CERTIFICATE OF CORRECTION

PATENT NO. : 6,040,665
DATED : March 21, 2000
INVENTOR(S) : Kenji Shirai, et al.

It is certified that error appears in the above-identified patent and that said Letters Patent is hereby corrected as shown below:

Title page,
Item [73] Assignee: Add second assignee, - ASMO CO., LTD., Shizuoka-ken, 431-0493 Japan --.

Column 4,
Line 29, change "0" to -- $\theta$ --.

Column 6,
Line 31, change "0" to -- $\theta$ --.
Line 47, change "0" to -- $\theta$ --.

Column 12,
Line 27, change "100106" to -- 10052 --.

Signed and Sealed this

Twenty-eighth Day of August, 2001

Attest:

NICHOLAS P. GODICI
*Attesting Officer*     *Acting Director of the United States Patent and Trademark Office*